United States Patent
Gildein et al.

(10) Patent No.: US 12,092,053 B2
(45) Date of Patent: Sep. 17, 2024

(54) PISTON FOR A RECIPROCATING PISTON MACHINE, AND RECIPROCATING PISTON MACHINE FOR A MOTOR VEHICLE

(71) Applicant: MERCEDES-BENZ GROUP AG, Stuttgart (DE)

(72) Inventors: Helmut Gildein, Winterbach (DE); Herbert Zoeller, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 17/763,963

(22) PCT Filed: Aug. 13, 2020

(86) PCT No.: PCT/EP2020/072692
§ 371 (c)(1),
(2) Date: Mar. 25, 2022

(87) PCT Pub. No.: WO2021/058192
PCT Pub. Date: Apr. 1, 2021

(65) Prior Publication Data
US 2022/0307445 A1 Sep. 29, 2022

(30) Foreign Application Priority Data
Sep. 27, 2019 (DE) ...................... 10 2019 006 760.6

(51) Int. Cl.
F02F 3/28 (2006.01)
(52) U.S. Cl.
CPC ..................... F02F 3/28 (2013.01)

(58) Field of Classification Search
CPC ....... F02F 3/28; F02F 3/26; F02F 3/24; F02B 23/0672; F02B 23/0693; F02B 23/0684
See application file for complete search history.

(56) References Cited

U.S. PATENT DOCUMENTS

| | | | |
|---|---|---|---|
| 6,708,666 B2* | 3/2004 | Roberts, Jr. | F02B 23/08 123/193.5 |
| 7,055,491 B2* | 6/2006 | Linderyd | F02F 3/14 123/279 |

(Continued)

FOREIGN PATENT DOCUMENTS

| | | |
|---|---|---|
| AT | 518516 B1 | 3/2018 |
| CN | 205135827 U | 4/2016 |

(Continued)

OTHER PUBLICATIONS

Machine translation, Detailed Description, CN 108678870A, Wei et al., obtained from https://worldwide.espacenet.com/, pp. 1-6.*

(Continued)

*Primary Examiner* — Grant Moubry
(74) *Attorney, Agent, or Firm* — Crowell & Moring LLP

(57) ABSTRACT

A piston for a reciprocating piston machine includes a piston crown, a piston recess, and an annular groove formed in the piston crown. The annular groove extends in a radial direction of the piston outwards and a cross-section of the annular groove has a half-teardrop shape. The half-teardrop shape has a first radius and a second radius where the second radius is directly contiguous with the first radius outwards in the radial direction of the piston and where the second radius is greater than the first radius.

11 Claims, 2 Drawing Sheets

(56) References Cited

U.S. PATENT DOCUMENTS

| | | | |
|---|---|---|---|
| 7,185,614 B2* | 3/2007 | Meffert | F02B 23/0687 123/41.35 |
| 9,464,593 B2* | 10/2016 | Böwing | F02F 3/28 |
| 9,611,806 B2* | 4/2017 | Subatch, Jr. | F02B 23/06 |
| 10,316,734 B2* | 6/2019 | Svensson | F02B 23/0621 |
| 2020/0340391 A1 | 10/2020 | Machold et al. | |

FOREIGN PATENT DOCUMENTS

| | | | | |
|---|---|---|---|---|
| CN | 105604727 A | 5/2016 | | |
| CN | 105909420 A | 8/2016 | | |
| CN | 106089480 A | 11/2016 | | |
| CN | 108678870 A | 10/2018 | | |
| CN | 208474015 U | 2/2019 | | |
| DE | 19829384 A1 * | 1/2000 | | F02B 23/0672 |
| DE | 10 2013 022 040 A1 | 6/2015 | | |
| DE | 10 2015 012 541 A1 | 4/2016 | | |
| DE | 10 2016 112 538 A1 | 1/2018 | | |
| DE | 10 2017 127 291 A1 | 5/2019 | | |
| FR | 2 861 136 A1 | 4/2005 | | |
| FR | 2884284 A1 * | 10/2006 | | F02B 23/0672 |
| FR | 3029984 A3 * | 6/2016 | | F02B 23/0672 |
| JP | 2010-112347 A | 5/2010 | | |

OTHER PUBLICATIONS

Chinese Office Action issued in Chinese Application No. 202080064340.4 dated Jul. 29, 2023, with partial English translation (11 pages).

PCT/EP2020/072692, International Search Report dated Nov. 20, 2020 (Two (2) pages).

German-language German Office Action issued in German application No. 10 2019 006 760.6 dated Mar. 23, 2020 (Seven (7) pages).

* cited by examiner

PISTON FOR A RECIPROCATING PISTON MACHINE, AND RECIPROCATING PISTON MACHINE FOR A MOTOR VEHICLE

BACKGROUND AND SUMMARY OF THE INVENTION

The invention relates to a piston for a reciprocating piston machine, in particular of a motor vehicle. The invention further relates to a reciprocating piston machine for a motor vehicle.

DE 10 2016 112 538 A1 discloses a piston for a reciprocating piston machine, with a piston crown and with a piston recess. In addition the piston has an annular groove in the piston crown, the annular groove being formed in the piston crown and following the piston recess outwards and upwards in the radial direction of the piston, the cross-section of which is of a half-teardrop shape. In other words the cross-section of the annular groove is configured as half-teardrop-shaped. In DE 10 2016 112 538 A1 the circumferential annular groove in the piston crown is also called a trough-shaped recess, the cross-section of which, also called radial section, is contoured or has contouring. The contouring comprises a radially outer segment with a circular-arc-shaped contour and a radially inner segment, directly contiguous with the circular-arc-shaped contour, with a ramp-shaped or tangential contour. The ramp-shaped or tangential contour is directly or immediately contiguous inwards in the radial direction of the piston with the circular-arc-shaped contour, so that no further, other contour of the contouring is arranged between the circular-arc-shaped contour and the ramp-shaped or tangential contour.

In addition, a piston for a reciprocating piston machine is also to be regarded as known from FR 2 861 136 A1.

The aim of the present invention is to create a piston and a reciprocating piston machine with at least one such piston, so that particularly low-emission, efficient operation of the reciprocating piston machine can be achieved.

A first aspect of the invention relates to a piston for a reciprocating piston machine, preferably configured as a combustion engine or as an internal combustion engine, in particular of a motor vehicle. This means that the motor vehicle in its fully manufactured state comprises the reciprocating piston machine preferably configured as an internal combustion engine and is drivable by means of the combustion machine. Moreover, the motor vehicle is configured for example as a motor car. The reciprocating piston machine has for example a cylinder, in which the piston is mounted and is capable of translatory motion. The piston has a piston crown with a piston recess, surrounded by the piston crown. In addition the piston has an annular groove formed in the piston crown, which follows outwards in the radial direction of the piston onto the piston recess. This means that the annular groove is arranged in the radial direction of the piston between the piston recess and an edge of the piston outermost in the radial direction of the piston, wherein the edge of the piston outermost in the radial direction is also designated as the outer edge of the piston. In the radial direction of the piston, the annular groove is at a distance from the piston recess and extends circumferentially in the piston crown. This means in particular that the piston recess does not as it were transition without interruption into the annular groove, but the annular groove is for example at a distance from the piston recess in the radial direction of the piston, in particular in such a way that in the radial direction of the piston, a circumferential wall, in particular in the peripheral direction of the piston, is arranged between the annular groove and the piston recess, by which, in the radial direction of the piston, the annular groove is separated, divided off or subdivided from the piston recess.

In its cross-section, also designated as radial section, the annular groove is configured as half-teardrop-shaped. In other words the cross-section of the annular groove has a half-teardrop shape. The half-teardrop-shaped cross-section, in the context of the invention, extends or lies in a section plane, which preferably extends in the axial direction of the piston, wherein the central axis of the piston lies in the section plane. The annular groove is preferably configured with respect to the central axis with rotational symmetry in the piston crown. For example the aforementioned outer edge of the piston extends in the peripheral direction of the piston. For example the outer edge extends on an outside diameter of the outer edge, whose mid-point lies on the central axis. The annular groove is preferably a recess, which extends circumferentially in the peripheral direction of the piston. In a first direction extending parallel to the axial direction of the piston, the recess is delimited by the piston crown or by a wall region of the piston crown. In a second direction extending parallel to the axial direction of the piston and for example opposite to the first direction, the annular groove, when only considering the piston, is preferably unlimited, i.e., open or free.

Now, in order to achieve particularly low-emission, efficient operation of the reciprocating piston machine, it is envisaged according to the invention that the half-teardrop shape has a first radius and a second radius directly contiguous with the first radius outwards in the radial direction of the piston, so that the first radius extends or is arranged in the radial direction of the piston between the second radius and the piston recess. The feature that the second radius is immediately or directly contiguous with the first radius means that no further, other radius of the half-teardrop shape is arranged between the radii. In addition, for example the feature that the half-teardrop shape has the first radius and the second radius means that the half-teardrop shape or the cross-section has an in particular half-teardrop-shaped contour, in particular internal contour, which for example is also called contouring. The contour then has the first radius and the second radius, or is formed by the first radius and the second radius, so that the half-teardrop shape is formed, in particular completely, by the first radius and the second radius. Moreover, it is envisaged according to the invention that the second radius is greater than the first radius.

The aforementioned cylinder of the reciprocating piston machine is delimited, for example outwards in the radial direction of the cylinder, by a cylinder wall, also called sliding path, which may be formed for example by a housing element, in particular by a crankcase, of the reciprocating piston machine. Owing to the half-teardrop shape of the cross-section and because the second radius, which is greater than the first radius, is directly contiguous with the first radius outwards, and not inwards, in the radial direction of the piston, in particular with a functioning engine of the reciprocating piston machine, advantageous flow turbulence may be generated in the annular groove. With a functioning engine, combustion processes take place in a combustion chamber of the reciprocating piston machine, wherein the combustion chamber is delimited partly by the cylinder, partly by a cylinder head and partly by the piston. The flow turbulence proceeds in such a way that any soot forming in the respective combustion process is moved away from the relatively cold cylinder wall, in particular by the flow turbulence, and is led into hot, oxygen-rich zones. This can ensure particularly advantageous soot afteroxidation, so that in particular soot emissions of the reciprocating piston machine can be kept at a particularly low level. The particularly advantageous soot afteroxidation, which is better compared to conventional pistons, makes it possible to achieve a particularly high compression ratio of the reciprocating piston machine, so that particularly effective combustion and low-fuel-consumption operation of the reciprocating piston machine can be achieved. Particularly low-fuel-consumption operation of the reciprocating piston machine can therefore be achieved. In addition, the $CO_2$ emissions of the reciprocating piston machine can be kept particularly low. In other words it was found that owing to the annular groove provided and configured according to the invention, particularly advantageous flow turbulence can be created in the annular groove. The flow turbulence can divert the soot into the region of the annular groove in which conditions are favourable for oxidation of the soot.

In one embodiment of the invention it is envisaged that the mid-point of the first radius lies in the region, in particular in the plane, outermost in the axial direction of the piston, extending perpendicularly to the axial direction of the piston, in which the piston crown is arranged or extends. Advantageously, with the arrangement of the mid-point of the first radius at least in the region of the plane of the piston crown, there is an almost right-angled transition from the plane of the piston crown into the annular groove, so that when there is a combustion process in the combustion chamber, flow turbulence develops in the annular groove, so that efficient, low-emission operation is achievable. If the mid-point of the first radius lies in the plane, outermost in the axial direction of the piston, extending perpendicularly to the axial direction of the piston, particularly efficient, low-emission operation is achievable.

In a further configuration of the invention it is envisaged that the first radius amounts to 1% to 5% of an outside diameter of the piston and the second radius amounts to 5% to 20% of the outside diameter of the piston. Advantageously, formation of the flow turbulence formed in the annular groove may be supported by the second radius, so that the flow turbulence can be stabilized, and as a result the flow turbulence can be created particularly advantageously.

In order to be able to keep the fuel consumption of the reciprocating piston machine particularly low, in a further embodiment of the invention it is envisaged that the annular groove has an inside diameter that is 70% to 90% of an outside diameter, in particular of the largest outside diameter, of the piston. The aforementioned inside diameter of the annular groove may in particular be taken to mean the following: The annular groove ends for example inwards in the radial direction of the piston, i.e., in the direction of the piston recess, at or on the aforementioned inside diameter.

In a particularly advantageous embodiment of the invention it is envisaged that the half-teardrop shape ends on a separation edge, inwards in the radial direction of the piston. This means that an edge between the first radius of the annular groove and the plane of the piston crown is configured relatively abruptly, without a gentle transition. As a result, particularly advantageous flow turbulence may be created in the annular groove, so that for example the aforementioned soot is led particularly advantageously, so that the soot can be kept away from the cylinder wall at least partially, in particular at least mainly or completely, and can be oxidized further in the annular groove.

Moreover, it has proved particularly advantageous if the separation edge has a radius of at most a millimeter. It has proved to be particularly advantageous if the radius of the separation edge is in a range from 0.1 mm to 0.2 mm, inclusive. As a result, particularly advantageous flow, in particular flow turbulence, may be created in the combustion chamber, so that particularly advantageous soot afteroxidation can be ensured.

In order to be able to keep the fuel consumption of the reciprocating piston machine particularly low, in a further variant of the invention it is envisaged that a distance extending in the radial direction of the piston between the separation edge and the edge of the piston outermost in the radial direction of the piston is in a range from 6% inclusive to 10% inclusive of the outside diameter, in particular of the largest outside diameter, of the piston.

A further embodiment is characterized in that a width of the annular groove amounts to 3% to 12% of the outside diameter of the piston. Particularly efficient, low-fuel-consumption operation can be achieved as a result.

Finally it has proved particularly advantageous if a width of the annular groove amounts to 3% to 12% of the outside diameter of the piston. Particularly efficient, low-emission operation can be ensured thereby.

A second aspect of the invention relates to a reciprocating piston machine, preferably configured as a combustion engine or internal combustion engine, for a motor vehicle, in particular for a motor car preferably configured as a passenger car. The reciprocating piston machine has at least one cylinder and at least one piston, in particular at least one piston according to the invention, according to the first aspect of the invention, wherein the piston is mounted in the cylinder and is capable of translatory motion. The piston, a cylinder head and the cylinder partly delimit in each case a combustion chamber of the reciprocating piston machine. The piston has a piston crown and a piston recess and an annular groove formed in the piston crown and extending outwards in the radial direction of the piston onto the piston recess, the cross-section of which has a half-teardrop shape. Now in order to be able to achieve particularly efficient, low-emission operation of the reciprocating piston machine, it is envisaged according to the invention that the half-teardrop shape has a first radius and has a second radius contiguous directly or immediately with the first radius, outwards in the radial direction of the piston, and greater than the first radius. Advantages and advantageous configurations of the first aspect of the invention are to be regarded as advantages and advantageous configurations of the second aspect of the invention, and vice versa.

The reciprocating piston machine is preferably configured as a diesel engine. The annular groove is preferably a circumferential recess formed in the piston crown, in the peripheral direction of the piston. It was found that owing to the half-teardrop shape, a particularly harmonious flow deflection can be achieved, because by means of the two radii, that is by means of the first radius and the second radius of the half-teardrop shape, the flow can be gently deflected in an advantageous direction. Preferably the aforementioned sharp separation edge is provided, which is also termed flow separation edge. The flow separation edge creates advantageous flow turbulence in the annular groove. Preferably the mid-point of the first radius lies in the plane of the piston crown, so that the piston crown and the first radius together enclose a right angle or at least approximately a right angle, so that the sharp separation edge can be formed, so that an advantageous flow separation can be produced. The flow turbulence is produced during movement of the piston from its top dead center (TDC) towards its bottom dead center (BDC) and forms in the annular groove or in the region of the annular groove, in which the flow in the combustion chamber is led from above the piston crown via the flow separation edge towards the annular groove and is then deflected by means of the first radius and the second radius towards the piston mid-point. In the flow turbulence, soot forming during combustion can mix with combustion air and subsequently be oxidized further.

It was found that by means of the annular groove provided and configured according to the invention, soot emission can be decreased markedly compared to conventional reciprocating piston machines. The background of the invention is in particular the endeavor to raise the compression ratio of an or of the reciprocating piston machine preferably configured as a diesel engine appreciably compared to conventional solutions, for example from a compression ratio of 15 to a compression ratio of 17.5, in order to achieve a particularly high efficiency of combustion, in particular of diesel combustion, consequently lowering fuel consumption and preventing excessive soot emission. To increase the compression ratio, however, it is usually necessary to reduce the volume in the combustion chamber. This can be achieved by reducing the size of the piston recess. Then at least the walls of the piston move closer to the piston mid-point and therefore closer towards an injector, by means of which fuel, in particular liquid fuel, can be injected directly into the combustion chamber. As a consequence, the injection spray travels a shorter distance until it reaches the piston recess, so that less time remains for thorough mixing of the injected fuel with the combustion air in the combustion chamber. As a consequence, relatively large fuel droplets reach the piston, which for their part burn less completely and in addition cool the piston, so that the proportion of soot in the combustion chamber increases. Owing to the annular groove provided and configured according to the invention, this disadvantage can be countered effectively, as the increasing proportion of soot due to the decrease in combustion chamber volume and the associated increase in compression ratio can be prevented effectively by the flow turbulence in the annular groove, in particular by the soot afteroxidation described above. Accordingly, with the compression ratio unchanged, soot emission can be lowered even more with the annular groove provided and configured according to the invention. The aforementioned flow turbulence is turbulence that develops in the region of the annular groove. As a result, during combustion, any soot forming in the combustion chamber is oxidized further.

Further advantages, features and details of the invention can be seen from the following description of preferred embodiment examples and from the drawings. The features and combination of features stated above in the description and features and combination of features stated hereunder in the description of the figures and/or only shown in the figures are usable not only in the combination presented in each case, but also in other combinations or alone, while remaining within the scope of the invention.

DETAILED DESCRIPTION OF THE DRAWINGS

In the figures, identical or functionally equivalent elements are given the same reference symbol.

Figure 1:
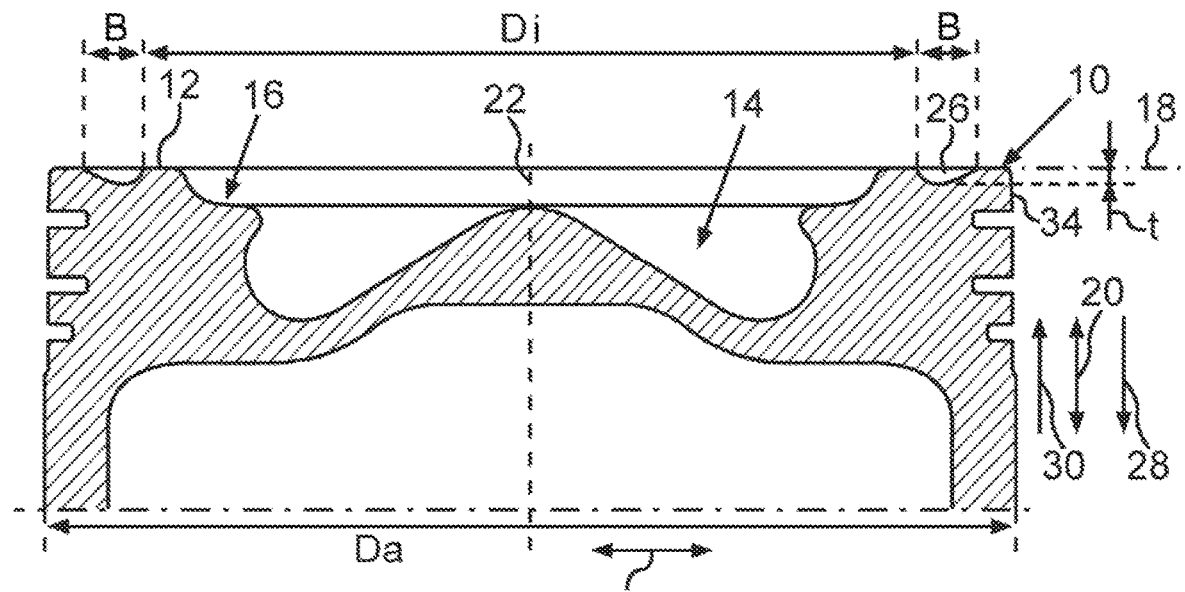
FIG. 1 is a schematic sectional view of a detail of a piston according to the invention, according to a first embodiment.
Figure 2:
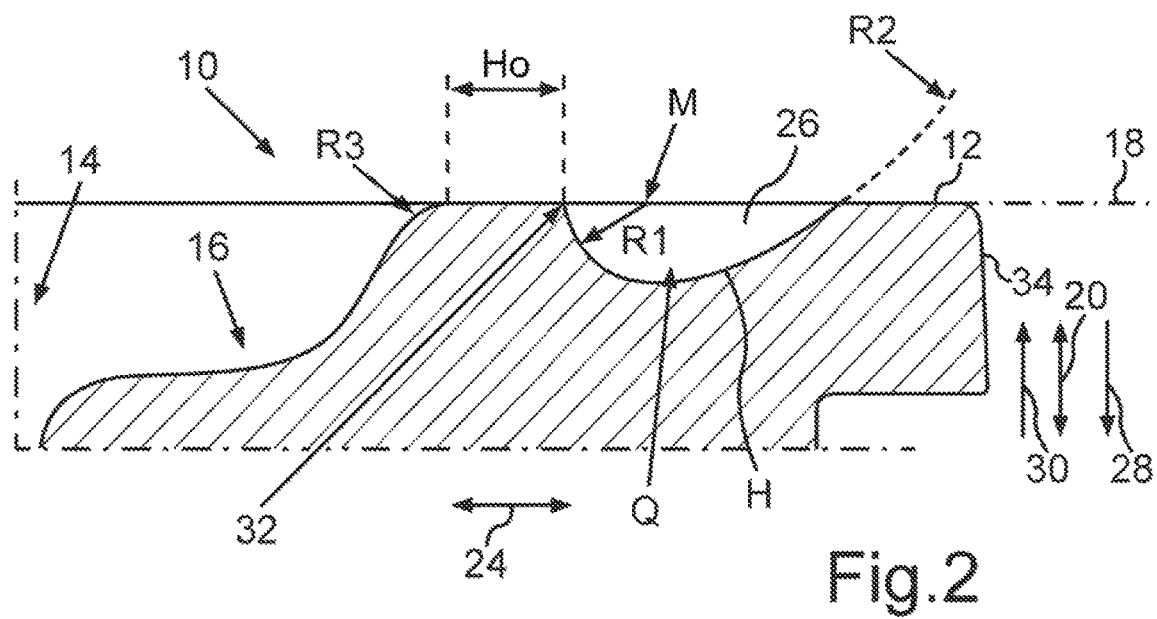
FIG. 2 is a further schematic sectional view of a detail of the piston according to FIG. 1.
Figure 4:
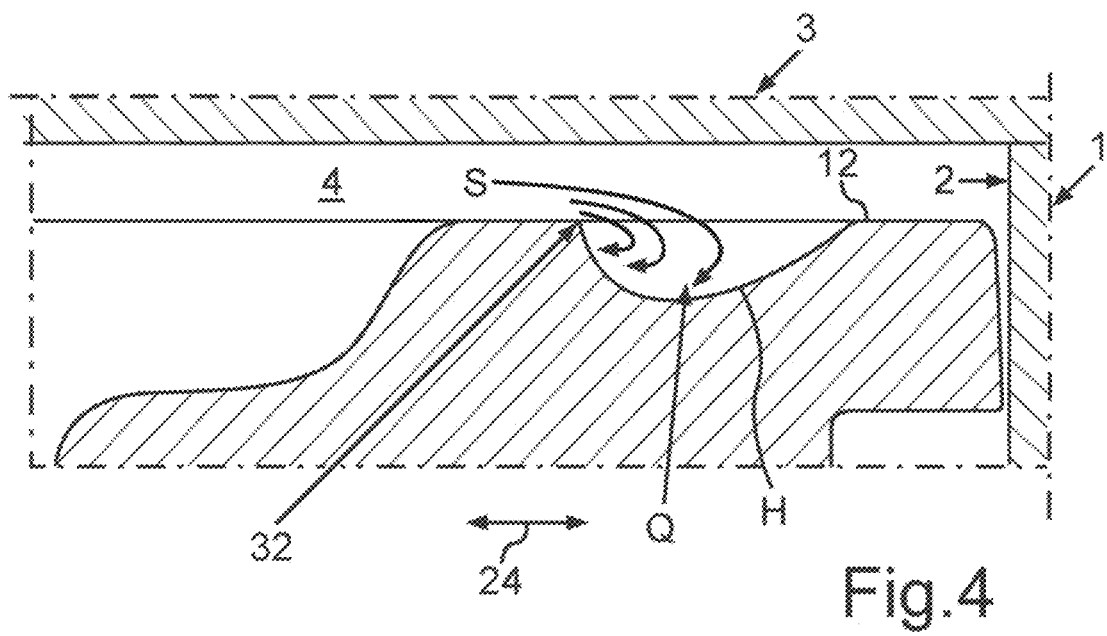
FIG. 4 is a further schematic sectional view of a detail of a cylinder head, a cylinder and of the piston according to FIG. 2.

FIGS. 1 and 2 show in each case a schematic sectional view of a detail of a piston 10 for a reciprocating piston machine of a motor vehicle. This means that the motor vehicle, preferably configured as a motor car, in its fully manufactured state comprises the reciprocating piston machine, which is configured as a combustion engine or as an internal combustion engine. Moreover, the motor vehicle is drivable by means of the reciprocating piston machine. For this purpose the reciprocating piston machine is operable in its engine operating mode. The reciprocating piston machine has a housing element, which for example is configured as a crankcase. The housing element forms a cylinder 1 or has at least one cylinder 1, which in the radial direction of the cylinder 1 is delimited outwards by a cylinder wall 2. The piston 10 is arranged in the cylinder 1 and is capable of translatory motion, so that the piston 10 can move to and fro in translatory motion relative to the cylinder wall 2 between a bottom dead center (BDC) and a top dead center (TDC). The cylinder 1 or the cylinder wall 2, a cylinder head 3 and the piston 10 delimit in a known manner in each case partially a combustion chamber 4 of the reciprocating piston machine. For reasons of clarity, only the cylinder 1 with cylinder wall 2, the cylinder head 3 and the combustion chamber 4 are presented in greater detail in FIG. 4. With a functioning engine, by means of an injector assigned to the combustion chamber 4, not shown in more detail in the figures, a fuel, in particular a liquid fuel, is injected directly into the combustion chamber 4. The fuel is for example a diesel fuel, so that the reciprocating piston machine is configured for example as a diesel engine.

The piston 10 has a piston crown 12 with a piston recess 14, configured as an omega recess currently known by a person skilled in the art, which is enclosed by the piston crown 12, i.e., is introduced into the piston 10. FIGS. 1 and 2 show a first embodiment of the piston 10. The piston 10 is configured as a stepped piston, so that the piston recess 14 is configured as a stepped recess. This means that the piston recess 14 has exactly one step 16. The step 16 lies in the axial direction of the piston 10 between the lowest point of the piston recess 14 in the axial direction of the piston 10 and the outermost, imaginary plane 18 extending in the axial direction of the piston 10 and perpendicularly to the axial direction of the piston 10, in which the piston crown 12 is arranged, extends or ends. The axial direction of the piston 10 is indicated in FIG. 1 with a double-headed arrow 20. In addition, the central axis of the piston 10 is shown in FIG. 1 and is designated with 22. The piston crown 12, the piston recess 14 and the step 16, in each case considered for themselves alone, are configured with rotational symmetry with respect to the central axis 22. The axial direction of the piston 10 coincides with the central axis 22. In addition, the radial direction of the piston 10 is indicated with a double-headed arrow 24 in FIG. 1, wherein the radial direction extends perpendicularly to the axial direction.

The piston 10 has in addition an annular groove 26, with cross-section Q being of half-teardrop shape H, formed in the piston crown 12 and extending in the radial direction of the piston 10 outwards to the piston recess 14 and piston step 16. It can be seen from FIGS. 1 and 2 that the half-teardrop shape H is or has a contour, also designated as contouring, which is half-teardrop-shaped. Therefore the cross-section Q or the annular groove 26 is configured as half-teardrop-shaped. The annular groove 26 is a recess, which on examining the piston 10 alone, is delimited by the piston crown 12, in particular by a wall region of the piston crown 12, in a first direction extending parallel to the axial direction of the piston 10 and indicated in FIGS. 1, 2 and 3 with an arrow 28. However, in a second direction indicated in FIGS. 1 and 2 with an arrow 30, extending parallel to the axial direction of the piston 10 and opposite to the first direction, the recess (annular groove 26), when only considering the piston 10, is unlimited, i.e., open or free. The annular groove 26 extends for example in a peripheral direction of the piston 10 extending about the central axis 22 and is configured with rotational symmetry with respect to the central axis 22. The annular groove 26 has a depth t extending in the axial direction of the piston 10, and extending in the axial direction of the piston 10 from the plane 18 to the lowest point of the annular groove 26. In addition, in FIG. 1 the largest outside diameter of the piston 10 is designated Da. A person skilled in the art knows that a piston for combustion engines does not have a purely cylindrical shape, but as a rule may have a slightly barrel-shaped outer contour and/or may have a constriction in the region of the piston rings. The depth t is for example 1% to 5% of the outside diameter Da.

Now, in order to achieve operation of the reciprocating piston machine with particularly low fuel consumption and low emissions, the half-teardrop shape H has—as can be seen particularly well from FIG. 2—a first radius R1 and a second radius R2 in the radial direction of the piston 10 outwards, directly contiguous with the first radius R1 and greater than the first radius R1. This means that the aforementioned contouring has the radii R1 and R2 and is formed at least mainly, in particular exclusively, by the radii R1 and R2. The feature that the radii R1 and R2 are immediately or directly contiguous with one another in the radial direction of the piston, means in particular that no other, further radius of the half-teardrop shape H is arranged in the radial direction of the piston 10 between the radii R1 and R2. The radius R1 has a direct transition to the radius R2. In the embodiment shown in FIGS. 1 and 2, the first radius R1 is 1% to 5% of the outside diameter Da of the piston 10 and the second radius R2 is 5% to 20% of the outside diameter Da of the piston 10. A mid-point M of the first radius R1 lies in the region of the plane 18 extending in the outermost axial direction of the piston, perpendicular to the axial direction of the piston. FIG. 2 shows a particularly advantageous configuration of the piston 10 according to the invention, wherein the mid-point M lies in the plane 18. Advantageously, there is a gentle transition between the radius R1 and the radius R2.

Preferably, the half-teardrop shape H ends, in the radial direction of the piston 10 inwards, on a separation edge 32, the radius of which is preferably at most a millimeter. Preferably the radius of the separation edge 32 is in a range from 0.1 mm to 0.2 mm, inclusive. The separation edge 32 is an edge extending with rotational symmetry about the central axis 22 in the plane 18 or the piston crown 12, which defines an inside diameter Di of the annular groove 26.

Preferably the inside diameter Di of the annular groove 26 is 70% to 90% of the outside diameter Da of the piston 10. Moreover, the width Db of the annular groove 26 is 3% to 12% of the outside diameter Da of the piston 10.

Moreover, preferably a distance extending in the radial direction of the piston 10 between the separation edge 32 and the outermost edge 34 of the piston 10 outermost in the radial direction and extending to the outside diameter Da, is 6% to 10% of the outside diameter Da of the piston 10, which is also designated as piston outside diameter. The outermost edge 34 of the piston 10 denotes the region at the outermost end of the piston crown 12 of the piston 10 towards the cylinder 1.

In order to achieve a particularly laminar flow in the combustion chamber, in particular in a pinch gap known per se between the piston crown 12 and the cylinder head 3 with a translatory movement of the piston 10 from its top dead center (TDC) to its bottom dead center (BDC), a transition between the piston step 16 and the piston crown has a radius R3, which is in a range between 1.5% and 10% of the outside diameter Da of the piston 10. A horizontal segment Ho of the piston crown 12 may be contiguous with the radius R3 up to the separation edge 32. The width of the horizontal segment Ho may be between 1% and 5% of the outside diameter Da of the piston 10.

Figure 3:
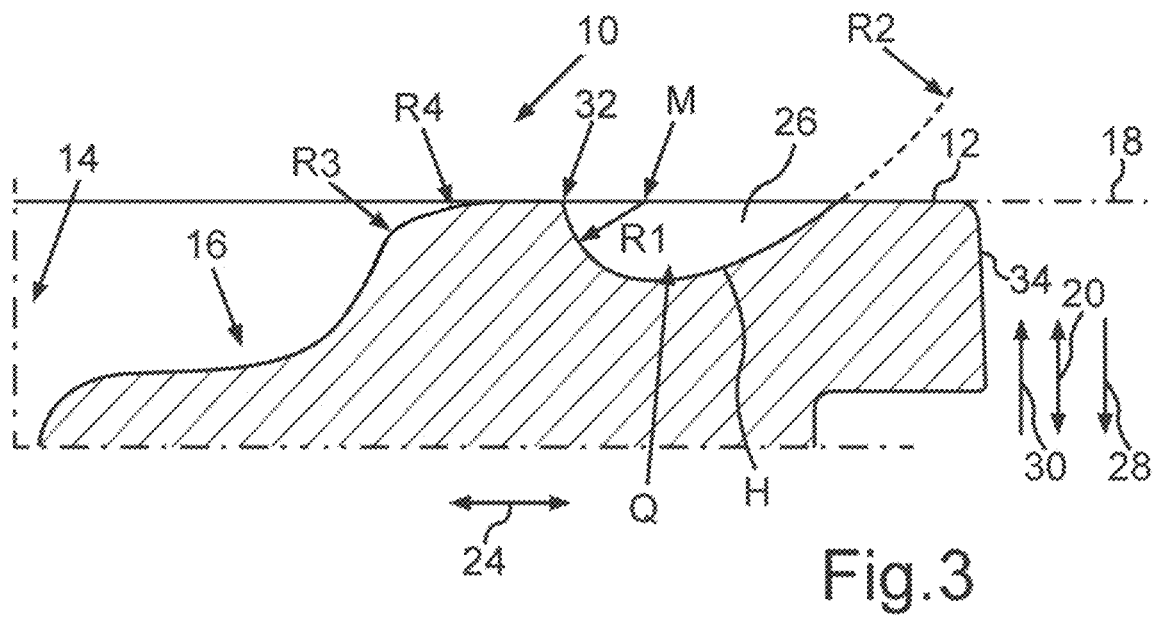
FIG. 3 is a schematic sectional view of a detail of the piston according to a second embodiment.

An alternative configuration of the piston 10 according to the invention is shown in FIG. 3. Instead of the horizontal segment Ho, a further radius R4 is contiguous with the radius R3 up to the separation edge 32. The radius R4 is 4% to 20% of the outside diameter Da of the piston 10.

By means of the annular groove 26, particularly advantageous turbulence may be generated; soot that may form in the respective combustion process is moved away from the relatively cold cylinder wall and led into hot, oxygen-rich zones. In these zones, the soot may advantageously be oxidized further, so that excessive soot emissions of the reciprocating piston machine may in particular be avoided. Owing to the advantageous soot afteroxidation, a particularly high compression ratio of the reciprocating piston machine may be achieved, so that particularly effective and efficient combustion is achievable. As a result, the fuel consumption of the reciprocating piston machine can be kept particularly low.

As the annular groove 26 is configured as half-teardrop-shaped, the annular groove 26 has a half-teardrop-shaped contour, which comprises the radii R1 and R2. If the piston 10 moves from its top dead center (TDC) towards its bottom dead center (BDC), in particular in the region of the separation edge 32, an initially horizontal flow is converted or deflected into an at least substantially circular flow, so that for example the so-called Karman vortex street forms. This kind of flow S is shown schematically with three arrows in FIG. 4. Besides other flows in the combustion chamber 4 that are not shown, the flow S is formed essentially by an inverse pinch gap flow, known per se, between the cylinder head 3 and the piston 10, in particular the piston crown 12 of the piston 10. The inverse pinch gap flow is directed essentially from the direction of the central axis 22 of the piston 10 radially outwards towards the cylinder 1 or the cylinder wall 2. On movement of the piston 10 from its bottom dead center (BDC) towards its top dead center (TDC), there is formation of the pinch gap flow, known per se, wherein a flow develops, which moves essentially opposite to the inverse pinch gap flow from the direction of the cylinder 1 towards the central axis 22 of the piston 10. Owing to the inverse pinch gap flow, the initially horizontal flow is deflected at least partially on the separation edge 32 towards the annular groove 26. Owing to the radii R1 and R2, of overall convex shape viewed from the flow S, there is gentle deflection of the flow S in the annular groove 26 towards the center of the piston 10, so that essentially a ricocheting of the flow S in all directions can be prevented by the annular groove 26, so that flow turbulence essentially in the form of a torus forms in the annular groove. Owing to this flow deflection or reversal, similar to a dead water zone, flow turbulence develops, which thoroughly mixes not yet further oxidized soot particles with oxygen-rich air and thus makes afteroxidation of the soot particles possible. Moreover, the transport of soot by the inverse pinch gap flow to the cylinder 1 is prevented at least partially. Apart from the preferably sharp separation edge 32, also called flow separation edge, the half-teardrop shape H does not have a sharp edge, to prevent undesirable throttling of the flow and undesirable hampering of vortex formation.

The annular groove 26 may be formed completely and therefore without any interruption in the piston crown 16.

It is also conceivable that the annular groove 26 has interruptions, so that depending on the number of interruptions, the annular groove 26 extends in the piston crown 12 in a corresponding number of segments about the central axis 22 of the piston 10. For example, valve notches provided for exhaust valves and/or inlet valves in the piston crown 12 may interrupt the annular groove 26 at least partially. The configuration of valve notches in pistons is known by a person skilled in the art per se, so that a detailed description is omitted and valve notches are not shown in the figures. Valve notches for a piston according to the present piston 10 are formed as recesses in the piston crown 12, which on considering the piston 10 only in a first direction extending parallel to the axial direction of the piston 10 and indicated in FIGS. 1, and 2 and 3 with an arrow 28, are delimited by the piston crown 12, in particular by a wall region of the piston crown 12. Thus, the annular groove 26 may be interrupted partially or completely in the region of the valve notches, so that depending on the number of valve notches in the annular groove 26, the annular groove 26 extends in the piston crown 12 in corresponding segments about the central axis 22 of the piston 10. The annular groove 26 is interrupted completely, if a depth of a valve notch or some other interruption is greater than the depth t of the annular groove 26.

The aforementioned interruptions of the annular groove 26, in particular by valve notches, do not have any substantial influence in the production of the advantageous flow turbulence in the region of the respective segments of the annular groove 26.

LIST OF REFERENCE CHARACTERS

1 Cylinder
2 Cylinder wall
3 Cylinder head
4 Combustion chamber
10 Piston
12 Piston crown
14 Piston recess
16 Step
18 Plane
20 Double-headed arrow
22 Central axis
24 Double-headed arrow
26 Annular groove
28 Arrow
30 Arrow
32 Separation edge
34 Edge
Da Outside diameter
Di Inside diameter
B Width of the annular groove
Ho Horizontal segment
H Half-teardrop shape
Q Cross-section
R1 First radius
R2 Second radius
R3 Third radius
R4 Fourth radius
M Mid-point
S Flow
t Depth

The invention claimed is:

1. A piston for a reciprocating piston machine, comprising:
   a piston crown;
   a piston recess; and
   an annular groove formed in the piston crown, wherein the annular groove extends in a radial direction of the piston outwards and wherein a cross-section of the annular groove has a half-teardrop shape;
   wherein the half-teardrop shape has a contouring formed exclusively by a first radius and a second radius, wherein the second radius is directly contiguous with the first radius outwards in the radial direction of the piston, and wherein the second radius is greater than the first radius such that a flow in the annular groove is deflected towards a center of the piston, so that essentially a ricocheting of the flow in all directions is prevented by the annular groove, so that flow turbulence essentially in a form of a torus forms in the annular groove;
   wherein the annular groove has interruptions such that the annular groove extends in the piston crown in a corresponding number of segments about a central axis of the piston.

2. The piston according to claim 1, wherein a mid-point of the first radius lies in a plane of the piston crown extending in an outermost axial direction of the piston and perpendicular to the axial direction of the piston.

3. The piston according to claim 1, wherein the first radius is 1% to 5% of an outside diameter of the piston and wherein the second radius is 5% to 20% of the outside diameter of the piston.

4. The piston according to claim 1, wherein the annular groove has an inside diameter which is 70% to 90% of an outside diameter of the piston.

5. The piston according to claim 1, wherein the half-teardrop shape, in the radial direction of the piston inwards, ends on a separation edge.

6. The piston according to claim 5, wherein the separation edge has a radius of at most 1 mm.

7. The piston according to claim 5, wherein a distance extending in the radial direction of the piston between the separation edge and an edge of the piston outermost in the radial direction is in a range from 6% to 10% inclusive of an outside diameter of the piston.

8. The piston according to claim 1, wherein a width of the annular groove is 3% to 12% of an outside diameter of the piston.

9. The piston according to claim 1, wherein the piston is configured as a stepped piston such that the piston recess has at least or exactly one step.

10. A reciprocating piston machine for a motor vehicle, comprising:
    a cylinder; and
    the piston according to claim 1 disposed in the cylinder.

11. A piston for a reciprocating piston machine, comprising:
    a piston crown;
    a piston recess; and
    an annular groove formed in the piston crown, wherein the annular groove extends in a radial direction of the piston outwards and wherein a cross-section of the annular groove has a half-teardrop shape;
    wherein the half-teardrop shape has a contouring formed exclusively by a first radius and a second radius, wherein the second radius is directly contiguous with the first radius outwards in the radial direction of the piston, and wherein the second radius is greater than the first radius;

wherein the first radius is 1% to 5% of an outside diameter of the piston and wherein the second radius is 5% to 20% of the outside diameter of the piston;

wherein the annular groove has an inside diameter which is 70% to 90% of an outside diameter of the piston;

wherein a width of the annular groove is 3% to 12% of an outside diameter of the piston;

wherein the half-teardrop shape, in the radial direction of the piston inwards, ends on a separation edge;

wherein the separation edge has a radius of at most 1 mm;

wherein a distance extending in the radial direction of the piston between the separation edge and an edge of the piston outermost in the radial direction is in a range from 6% to 10% inclusive of an outside diameter of the piston;

wherein a flow in the annular groove is deflected towards a center of the piston, so that essentially a ricocheting of the flow in all directions is prevented by the annular groove, so that flow turbulence essentially in a form of a torus forms in the annular groove;

wherein the annular groove has interruptions such that the annular groove extends in the piston crown in a corresponding number of segments about a central axis of the piston.

* * * * *